United States Patent [19]
Gogerty

[11] 3,879,552
[45] Apr. 22, 1975

[54] ENHANCED LEARNING ABILITY BY USE OF THIORIDAZINE

[75] Inventor: John H. Gogerty, Dover, N.J.

[73] Assignee: Sandoz-Wander, Inc., Hanover, N.J.

[22] Filed: Sept. 28, 1973

[21] Appl. No.: 401,947

[52] U.S. Cl. ................................................ 424/247
[51] Int. Cl. ............................................ A61k 27/00
[58] Field of Search .................................... 424/247

[56] References Cited
OTHER PUBLICATIONS
Aceto et al. Journal of Pharm. Sciences, Vol. 50, 1961, pp. 823–827.

Primary Examiner—Stanley J. Friedman
Attorney, Agent, or Firm—Gerald D. Sharkin; Robert S. Honor

[57] ABSTRACT

Thioridazine is useful in enhancing the learning process of mammals.

3 Claims, No Drawings

ENHANCED LEARNING ABILITY BY USE OF THIORIDAZINE

This invention concerns the use of thioridazine in enhancing the process and degree of learning which thereby assists in improving intelligence and knowledge of mammals.

It has been observed in the recent past that Thioridazine is useful in avoiding interference with normal paradoxical (REM) sleep. Intake of habit forming or other drugs or alcohol cause such interference. Moreover, correlations established between learning and brain protein synthesis on one hand and amount of REM sleep time and protein synthesis on the other hand indicated to the instant inventor that certain experiments be performed which show a correlation between administration of Thioridazine and degree or rate of learning of mammals. Certain experimental procedures described more fully hereinafter were performed to test this correlation.

The instant invention accordingly provides a method for increasing the learning rate and ability of mammals by administration of Thioridazine in a manner so as to permit increased REM sleep in said mammals.

Because of variation of the normal or usual sleep time patterns of various species of mammals and individuals within one species, it will be understood that the appropriate time as well as the appropriate quantity for administration of Thioridazine will vary. Normally, Thioridazine may be combined with one or more pharmaceutically acceptable carriers or adjuvants and administered orally or parenterally. The desired dosage will vary depending upon the mode of administration and the reaction to treatment of the individual mammals involved. In general, however, it is desired that for purposes of this invention, mammals be administered Thioridazine at a daily dosage of about 0.18–30 mg/kg of animal body weight, and at a single dosage of about 0.18–15 mg/kg of animal body weight. It is preferred that at least one administration of Thioridazine take place within about one hour of the mammals major normal sleep period or periods. For most large animals, the total dosage is from about 10–200 mg. per day, preferably in intimate admixture with a solid or liquid pharmaceutically acceptable carrier.

The effect of Thioridazine on REM sleep has been noted by virtue of tests performed in cats and cebus monkeys orally administered about 0.18–15 mg/kg of animal body weight of Thioridazine by use of chronically implanted electrodes.

Monopolar cortical leads on the sensory motor and occipital cortices and an electro-oculogram were recorded via stainless steel screws. Bipolar concentric subcortical leads include the amygdala, hippocampus, septum, medium forebrain bundle, hypothalmus, olfactory bulb, anterior and posterior reticular formation and the lateral geniculate nucleus of the thalamus were among the sites used for implantations. The exposed tip of the electrode extended 0.5–0.75 mm. beyond the barrel. Brain readings were obtained via Grass Model 6, 10 or 16 channel electroencephalographs.

For the recording sessions, the test animals were placed in Lehigh Valley Electronics full side observation cages at the same time every day for either 4 or 8 hours (cats) or every night for 13½ hours (monkeys). After 4 hours (during the 8 hour studies) the cats were allowed free access to food and water for 30 minutes. The monkeys were placed in their home cages and given free access to food and water during the day.

Outside noise was masked by background white noise. Gross behavior was monitored via closed circuit television and video tape recordings.

Control data were collected at least 2 days per week and accumulated to give control data for 10 to 20 sessions per cat or monkey.

Thioridazine was administered either stat, 15 or 30 minutes prior to placing the animals in the observation cages. Physiological saline was administered via similar routes and preinjection times (as above) on all control runs. Data from each session were statistically compared (via computer analysis) to the previous 10–20 control sessions for that particular animal, with particular emphasis given to the following phases of the sleep-wakefulness cycle: resting awake, light sleep, deep sleep, paradoxical (REM) sleep, "pseudo-" paradoxical sleep, latency to onset of first epoch of paradoxical sleep.

The method by which increased REM sleep was noted in the test animals was by observing the decrease in muscle tone while the animal is behaviorly asleep and eye movement increases. It is noted that this effect always follows a transitional activity characterized by neuronal spiking in the lateral geniculate nucleus and-/or the occipital cortex of the test animal.

In order to ascertain whether administration of Thioridazine in accordance with this invention was consistent with experimental evidence, six naive cebus monkeys were trained to lever press to obtain banana-flavored pellets and were started on a simple CRF (continuous reinforcement) schedule. Each bar press resulted in reward of one pellet. Criteria for rate of learning was speed at which total reward of 90 pellets per session was achieved.

On the basis of the results of the CRF test, the six monkeys were ranked with respect to "smartness," i.e., No. 1 monkey was the fastest learner, No. 2 next, etc. In this context, it was assumed that smartness was related to motivation to obtain food. The animals were then trained on a schedule whereby after a total of one pellet was rewarded 10 bar presses.

The monkeys were then divided into 2 groups: Nos. 1, 3 and 5 monkey were administered oral saline and Nos. 2, 4 and 6 monkey were given Thioridazine at 7.5 mg/kg p.o. for 22 days. Dosing was from 4–5 PM daily and the animals were allowed to sleep in their own cage to learn a schedule whereby a pellet is rewarded only when a bar press was preceded by a 30-second period without a bar press (DRL schedule). The results were as follows:

| Monkey No. | Results | Day No. | | | | | | | | | | | |
|---|---|---|---|---|---|---|---|---|---|---|---|---|---|
| | | 1 | 3 | 5 | 7 | 9 | 11 | 13 | 15 | 17 | 19 | 21 | 24 |
| 1 | Absolute Reinforcement | 37 | 31 | 36 | 25 | 34 | 78 | 93 | 121 | 105 | 99 | 118 | 110 |
| | Change from Day 1 | – | –6 | –1 | –12 | –3 | 41 | 56 | 84 | 68 | 62 | 81 | 73 |
| | Absolute Reinforcement | 2 | 6 | 38 | 42 | 26 | 57 | 55 | 65 | 57 | 50 | 46 | 49 |

-Continued

| Monkey No. | Results | 1 | 3 | 5 | 7 | 9 | 11 | 13 | 15 | 17 | 19 | 21 | 24 |
|---|---|---|---|---|---|---|---|---|---|---|---|---|---|
| 2 | Change from Day 1 | — | 4 | 36 | 40 | 24 | 55 | 53 | 63 | 55 | 48 | 44 | 47 |
|   | Absolute Reinforcement | 8 | 2 | 7 | 10 | 2 | 11 | 10 | 12 | 17 | 53 | 35 | 50 |
| 3 | Change from Day 1 | — | −6 | −1 | 2 | −6 | 3 | 2 | 4 | 9 | 45 | 27 | 42 |
|   | Absolute Reinforcement | 6 | 20 | 17 | 24 | 15 | 42 | 35 | 20 | 42 | 38 | 41 | 67 |
| 4 | Change from Day 1 | — | 14 | 11 | 18 | 9 | 36 | 29 | 14 | 36 | 32 | 35 | 61 |
|   | Absolute Reinforcement | 3 | 2 | 1 | 4 | 1 | 3 | 3 | 1 | 2 | 2 | 2 | 9 |
| 5 | Change from Day 1 | — | −1 | −2 | 1 | −2 | 0 | 0 | −2 | −1 | −1 | −1 | 6 |
|   | Absolute Reinforcement | 4 | 3 | 4 | 7 | 13 | 54 | 71 | 55 | 63 | 61 | 70 | 88 |
| 6 | Change from Day 1 | — | −1 | 0 | 3 | 9 | 50 | 67 | 51 | 59 | 57 | 66 | 84 |

The results show the relationship between change in the number of reinforcements (the pellets received over and above that received on the first day) and days on experiment. Note that the No. 1 monkey, which was the fastest learner in this CRF test, learned the DRL test at the same time that the slowest Mellaril-dosed monkey did. This experiment indicates that Thioridazine is able to enhance learning.

As used herein, the term "normal sleep" is intended to represent the longer and/or longest periods of sleep obtained on a normal daily basis by a mammal, whether by night or by day.

It will be understood that enhanced learning comprises both increased capacity for learning as well as increased rate of learning and both concepts are intended to be included in the present invention.

Thioridazine may be similarly administered in the form of its nontoxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, maleate, fumarate, acetate, p-toluenesulfonate and the like.

Representative formulations suitable for oral administration are tablets or capsules prepared by standard techniques which contain the following:

|  | Weight (mg) | |
|---|---|---|
|  | Tablet | Capsule |
| Thioridazine — HCl | 100 | 100 |
| Stearic Acid Powder, USP | 20 | 20 |
| *Cab-O-Sil (sub-microscopic, fire-dried fumed silica) | 2 | 2 |
| Starch | 20 | — |
| **Keltose (refined xanthan gum) | 25 | — |
| Lactose, USP | 4 | 138 |
| Sucrose Powder, USP | 9 | — |
| Calcum Sulfate, NF | 80 | — |
| TOTAL | 260 | 260 |

*Trademark, Cabot Corp., Boston, Mass.
**Trademark, Kelco Co., Clark, N.J.

What is claimed is:

1. A method for enhancing learning comprising administering to a mammal in which learning is desired to be enhanced 10–200 mg. of Thioridazine or a pharmaceutically acceptable salt thereof.

2. A method according to claim 1 wherein the administration takes place within about one hour before the mammal's normal sleep time.

3. A method according to claim 1 wherein the Thioridazine is administered before the normal sleep time of the mammal.

* * * * *